(12) United States Patent
Contreras et al.

(10) Patent No.: US 12,679,425 B1
(45) Date of Patent: Jul. 14, 2026

(54) HYBRID TRAIN ENERGY DELIVERY SYSTEM

(71) Applicants: Luis Contreras, Miami, FL (US); Juan Munoz, Miami, FL (US)

(72) Inventors: Luis Contreras, Miami, FL (US); Juan Munoz, Miami, FL (US)

(73) Assignee: AmeTrade, Inc., Miami, FL (US)

( * ) Notice: Subject to any disclaimer, the term of this patent is extended or adjusted under 35 U.S.C. 154(b) by 493 days.

(21) Appl. No.: 18/239,017

(22) Filed: Aug. 28, 2023

Related U.S. Application Data

(60) Provisional application No. 63/401,533, filed on Aug. 26, 2022.

(51) Int. Cl.
| | |
|---|---|
| *B61C 7/04* | (2006.01) |
| *B61C 3/00* | (2006.01) |
| *B61C 13/00* | (2006.01) |
| *H02M 7/48* | (2007.01) |
| *H02M 7/493* | (2007.01) |

(52) U.S. Cl.
CPC .................. *B61C 7/04* (2013.01); *B61C 3/00* (2013.01); *B61C 13/00* (2013.01); *H02M 7/48* (2013.01); *H02M 7/493* (2013.01)

(58) Field of Classification Search
CPC . B61C 3/00; B61C 7/04; B61C 13/00; H02M 7/48; H02M 7/493
See application file for complete search history.

(56) References Cited

U.S. PATENT DOCUMENTS

| | | | | |
|---|---|---|---|---|
| 6,408,766 | B1 | 6/2002 | McLaughlin et al. | |
| 6,591,758 | B2 * | 7/2003 | Kumar ..................... | B60L 50/30 |
| | | | | 180/65.245 |
| 6,612,245 | B2 * | 9/2003 | Kumar ...................... | B60L 9/16 |
| | | | | 105/1.4 |
| 6,615,118 | B2 * | 9/2003 | Kumar ...................... | B60L 9/02 |
| | | | | 701/19 |
| 7,304,445 | B2 * | 12/2007 | Donnelly ................ | B60L 50/30 |
| | | | | 180/65.265 |
| 7,349,797 | B2 * | 3/2008 | Donnelly .................. | B60L 7/08 |
| | | | | 701/19 |
| 7,430,967 | B2 * | 10/2008 | Kumar .................... | B60L 50/16 |
| | | | | 105/35 |

(Continued)

FOREIGN PATENT DOCUMENTS

CN 111923742 A * 11/2020 ................ H02P 6/00

*Primary Examiner* — Robert J McCarry, Jr.

(74) *Attorney, Agent, or Firm* — Reinhart Boerner Van Deuren P.C.

(57) ABSTRACT

A hybrid train energy delivery system for delivering electricity throughout a hybrid train based on a train's energy demands. The system can function to provide electricity in different currents or waveforms from at least one energy pack located on the train to the train's motor based on its needs and to the locomotive and various railcars of a train based on their needs. Further, the system can incorporate at least one energy storage container or railcar, which supports or houses the energy pack for the train, and at least one second converter that can assist in charging the energy pack and provide energy to the train via different currents and waveforms. Also, the system can incorporate a first converter that can wirelessly communicate with the second converter such that the second converter adjusts its electricity output per the train's demands.

24 Claims, 7 Drawing Sheets

(56)        References Cited

U.S. PATENT DOCUMENTS

| | | | |
|---|---|---|---|
| 7,507,500 B2 * | 3/2009 | Donnelly .......... | H01M 10/4207 |
| | | | 429/120 |
| 8,371,230 B2 * | 2/2013 | Kumar ..................... | B61C 7/04 |
| | | | 105/35 |
| 8,413,589 B2 | 4/2013 | Iden | |
| 8,640,629 B2 | 2/2014 | Barbee et al. | |
| 8,838,303 B2 * | 9/2014 | Hatanaka .............. | B60W 20/15 |
| | | | 701/19 |
| 8,899,158 B2 * | 12/2014 | Foege ..................... | B61C 17/02 |
| | | | 104/286 |
| 8,925,465 B2 * | 1/2015 | Foege ..................... | B60L 1/14 |
| | | | 105/1.4 |
| 9,186,997 B2 * | 11/2015 | Kanda ..................... | B60L 50/15 |
| 9,200,554 B2 * | 12/2015 | Cook ..................... | F01N 13/085 |
| 9,975,435 B2 | 5/2018 | Salomonsen | |
| 2007/0272116 A1 | 11/2007 | Bartley et al. | |
| 2008/0023966 A1 * | 1/2008 | Kumar ..................... | H02P 9/08 |
| | | | 290/40 C |
| 2010/0275810 A1 * | 11/2010 | Barbee ..................... | B60L 7/24 |
| | | | 320/136 |
| 2016/0001799 A1 * | 1/2016 | Cook ..................... | B61C 3/00 |
| | | | 105/35 |
| 2020/0224627 A1 * | 7/2020 | Banerjee .............. | F02N 11/006 |

* cited by examiner

HYBRID TRAIN ENERGY DELIVERY SYSTEM

CROSS REFERENCE TO RELATED APPLICATION(S)

This application claims the benefit under 35 U.S.C. § 119(e) to a U.S. Provisional Patent Application having Ser. No. 63/401,533 filed on Aug. 26, 2022. The above application is incorporated by reference herein in its entirety.

FIELD

The present invention relates generally to a hybrid energy delivery system that can be used in a variety of applications, and finds particular use in delivering electricity throughout a hybrid train based on a train's energy demands. Also, the present invention relates to systems for power converters to communicate and alter the characteristics of the power they either receive or transmit. Further, the present disclosure is related to a hybrid train energy delivery system that can incorporate at least one energy storage container or railcar which can support or house an energy pack for a train and a converter capable of outputting electricity of various voltages, currents, and waveforms while maintaining communication with another converter in a train's locomotive.

BACKGROUND

While the disclosure in this application is exemplified by application of the present invention to a locomotive power source, it will be appreciated that the present invention is applicable in a wide variety of circumstances.

However, it should be appreciated that the rail industry stands at a pivotal crossroads in its history, pressed by global pressures to mitigate its carbon footprint while ensuring sustained, efficient operations. The surge of industrial activity and the relentless demand for logistics services has been met with diesel-electric locomotives, largely because of their reliability, longevity, and cost-efficiency. However, as environmental concerns mount, the industry is under increasing scrutiny to decarbonize its operations. This presents a significant challenge: while there exist some solutions to achieve decarbonization, they often come with staggering costs. From the extensive overhead of electrification to the complete overhaul of the locomotive fleet using zero-emission propulsion technologies, the solutions available are often disruptive, expensive, and strain the established infrastructure.

The essence of the issue is multifaceted. Not only is there a need to transition from its reliance on diesel fuel, but it must also do so in a manner that is both cost-effective and, most importantly, minimally disruptive. This is a delicate balance to strike, given that any deviation from the established norm risks operational inefficiencies, increased downtime, and potential service disruptions associated with technology changeovers and training of personnel. Furthermore, merely transitioning to battery-electric technology isn't the ultimate answer; achieving parity between electric and traditional diesel-electric locomotives is the goal. This ensures that while the industry moves toward a more sustainable future, it does not become overburdened by costs, nor compromise on the efficiency and reliability that have become its hallmarks.

The standardized electrical power distribution systems on trains are referred to as head-end power or electric train supply. In the United States, head-end power is standardized as a three-phase alternating current delivered at four hundred eighty volts and about four hundred amps. It would be advantageous to make use of standard head-end power cables and connectors to deliver power from a battery car to the locomotive, because it would not require any specialized training for railway personnel when connecting and disconnecting battery cars. However, four hundred eighty volts and four hundred amps does not provide enough power transmission to fully replace a locomotive's prime mover, which are generally capable of supplying three megawatts or more to the traction motors.

In sum, there is a need for a cost-effective system which balances the use of sustainable electric power and traditional diesel-electric to power locomotives. Moreover, there is a financial need for such a system to be minimally invasive on the operations or downtime locomotives might experience when undergoing a transition from pure diesel electric to a hybridized form of propulsion.

SUMMARY

While the operative components and relationships of the present invention will be disclosed further below, it will be helpful if one preferred embodiment of the invention is first discussed in which a locomotive containing at least a first converter is disposed in two-way electrical communication via a plurality of head-end power junctions and cables with a rail car containing at least a second converter and an energy pack or plurality of battery cells. In such a configuration, and upon electrically connecting the first converter to the second converter, a handshake is performed by which each converter confirms its presence at either end of the electrical transmission route between them. Upon a successful handshake, the converters are operatively configured to transmit and receive a novel waveform which is capable of efficient power distribution. Namely, the second converter is operative to receive electrical power from the energy pack and transmit the electricity to the first converter in a novel waveform. In a most preferred embodiment, the novel waveform has a relatively square profile and repeats at a predetermined frequency. In having a square profile, the novel waveform can transmit power more efficiently than a standard alternating current given the same voltage. As such, it is possible, using the principles of the present invention, to transmit sufficient power from one train car containing an energy pack to the locomotive to power the traction motors, but using head-end power hardware, connections, junctions, and cables that are familiar to rail workers. In certain embodiments, this may require voltages higher than standardized head-end power, however, and may be in the range of eight hundred volts to one thousand volts. Using this novel waveform in three phase, and sending it across a plurality of head-end cables, up to four for example, at least three megawatts of power can be safely and efficiently transferred between a rail car containing an energy pack and the locomotive.

It will be appreciated that the handshake is a useful safety precaution given that the rail car containing the energy pack can be utilized in other ways. For example, it may simply be used to provide standard head-end power to the remaining cars in the consist. In such a use case, the converter in the rail car containing the energy pack will not receive a handshake, because no other car, except the locomotive, will have another converter of the type utilized by the present invention. Accordingly, if the converter of the present invention does not receive a handshake, it can be operative to transmit power in a variety of standard profiles and waveforms, such as the four hundred eighty volt, four hundred amp alternating current utilized in standard head-end power.

Alternatively, the rail car containing the energy pack can be used as a mobile power station, such as in emergency situations. In such an embodiment, the converter can also be operative to provide standard mains power, such as at one hundred ten, two hundred twenty, or two hundred forty volts.

In a most preferred embodiment, the converter is capable of two-way electrical transmission, both transmitting and receiving power, so that only a single type of converter can be manufactured and can be installed wherever necessary. Two-way electrical transmission can also facilitate recharging of the energy pack, such as if a train is running downhill or if the energy pack is connected to a charging station. Incorporating a converter with an energy pack in a single rail car can also facilitate the construction of less expensive charging stations as many electrical generators, such as windmills and solar panels, create direct current electricity, which is typically converted to alternating current before being utilized. The onboard converter can be configured to receive direct current and convert it to alternating current before charging the energy pack. Now that some preferred embodiments have been discussed, the remaining operative features can be disclosed in further detail. An energy delivery system in accordance with one embodiment of the present invention may comprise at least one first converter housed in a locomotive. At least one first converter may be electrically connected to at least one electric traction motor, electrically connected to at least one engine or generator unit, electrically connected to at least one head-end power connector, electrically connected to cabling, and electrically connected to at least one wiring system. The at least one first converter may also be operative and configured to output electricity to at least one electric motor in alternating current, direct current, a pulse width modulation signal, or other novel waveforms. The at least one first converter may be operative and configured to receive electricity input from (or output electricity to) said at least one head-end power connector, said cabling, said at least one wiring system, or combinations thereof. The at least one first converter may have a plurality of connection points for means of effectuating electrical connection to at least one component as described above. The at least one first converter may also be in wired or wireless communication with at least one second converter. The at least one first converter may have a unique identification code for communication purposes such that the at least one first converter may be recognized as a first converter by at least one second converter, which may be referred to as a handshake. The at least one first converter may also have at least one communication device operable to communicate data to devices and the at least one second converter. The at least one first converter may also be operative and configured to concurrently distribute and tailor electricity output to multiple distinct outputs, each output of electricity potentially having a specified current, waveform, or state. As such, said at least one first converter may be configured to operatively select between remaining in an idle state (where said at least one first converter may be receiving electricity), transmitting electricity in a single, isolated waveform, and, after receiving a handshake, transmitting electricity in a novel waveform. The at least one first converter may also be operative to receive quantifiable data and leverage at least one computing device to quantify, calculate, manipulate, and predict data, where the at least one first converter may also use the at least one computing device to quantify or produce demand data. The at least one first converter may also use the computing device so as to output (or transmit) electricity in the fashion as described above.

As the energy delivery system may also comprise at least one head-end power connector, said at least one head-end power connector may be electrically connected to cabling, said at least one first converter, and said at least one second converter. The said at least one head-end power connector may have a power limit rating of four hundred eighty volts, four hundred amps. The said at least one head-end power connector may be integrated into a locomotive, railcar, or both, and a plurality of head-end power connectors may be integrated into a locomotive or railcars. The energy delivery system may comprise a plurality of head-end power connectors without said head-end power connectors being integrated into a locomotive or railcar(s). The at least one head-end power connector may be configured and dimensioned to have electricity flow therethrough. The at least one head-end power connector may be configured and dimensioned to have data flow therethrough.

As the energy delivery system may also comprise at least one second converter, the at least one second converter may be housed in a railcar or in an energy storage container which may sit atop a flatcar. Notably, a railcar may operatively connect to at least another railcar or, optionally, the railcar may operatively connect to a locomotive. Alternatively, a flatcar may operatively connect to at least another flatcar or, optionally, the flatcar may operatively connect to a locomotive.

At least one second converter may be electrically connected to at least one head-end power connector, electrically connected to cabling, and electrically connected to at least one wiring system, and electrically connected to at least one energy pack. The at least one second converter may also be operative and configured to receive electricity input which may stem from a renewable or non-renewable source. The at least one second converter may be operative and configured to output electricity to (or receive input electricity from) said at least one head-end power connector, said cabling, said at least one wiring system, said at least one energy pack, or combinations thereof. The at least one second converter may alter properties of electricity input and be configured and dimensioned to transfer received electricity input to said at least one energy pack. The at least one second converter may have a plurality of connection points for means of effectuating electrical connection to at least one component described above. The at least one second converter may also be in wired or wireless communication with at least one first converter or at least one other second converter. The at least one second converter may have a unique identification code for communication purposes such that the at least one second converter may be recognized as a second converter by at least one first converter or at least one other second converter, which may be referred to as a handshake. The at least one second converter may also have at least one communication device operable to communicate data to devices and the at least one first converter or at least one other second converter. The at least one second converter may also be operative and configured to concurrently distribute and tailor electricity output to multiple distinct outputs, each output of electricity potentially having a specified current, waveform, or state. As such, said at least one second converter may be configured to operatively select between remaining in an idle state (where said at least one second converter may be receiving electricity), transmitting electricity in a single, isolated waveform, and transmitting electricity in a novel waveform.

Also, as such, said at least one second converter may be configured to operatively select between remaining in an idle state (where said at least one second converter may be receiving electricity), transmitting electricity in a single, isolated waveform, and transmitting electricity in a novel waveform. Said at least one second converter may be configured to operatively select between remaining in an idle state, transmitting electricity in a single, isolated waveform, and transmitting electricity in a novel waveform in response to demand data. Said demand data may be communicated to at least one said second converter by said at least one first converter. As such, the at least one second converter may be operative to receive such demand data. Further, the at least one second converter may be operative to receive quantifiable data at leverage at least one computing device to quantify, calculate, manipulate, and predict data, where the at least one second converter may also use the at least one computing device to quantify or produce resource data.

As the energy delivery system may also comprising cabling, said cabling may comprise at least one cable of between four hundred volts to at least one thousand volts voltage insulation rating. Further, cabling may be multiple cables within an insulating layer, or multiple cables each with an insulating layer. Where cabling exists, the present disclosure is not limited to one cable or one system of multiple cables with an insulating layer surrounding such multiple cables.

As the energy delivery system may also comprise at least one energy pack, said at least one energy pack may be housed by a railcar. Additionally, said at least one energy pack may be housed in an energy storage container. Where the energy delivery stem may comprise at least one energy pack, multiple energy packs may be housed by a single railcar or in a single energy storage container, or multiple energy packs may be housed by more than one railcar or more than one energy storage container. Further, the at least one energy pack may comprise at least one battery, at least one hydrogen fuel cell, or at least one form of energy storage.

Lastly, the energy delivery system may comprise at least one energy storage container. Said at least one energy storage container may house at least one energy pack and at least one second converter. Further, said at least one energy storage container may be configured and dimensioned to secure to a flatcar or a railcar. In addition, said at least one energy storage container may comprise at least one hoist point which may be configured and dimensioned for the connection of said at least one energy storage container to connect to a flatcar or railcar; and said at least one hoist point may be configured and dimensioned for the removal of said at least one energy storage container from a flatcar or railcar.

BRIEF DESCRIPTION OF THE DRAWINGS

For a fuller understanding of the nature of the present disclosure, reference should be had to the following detailed description taken in connection with the accompanying drawings in which:

FIG. 5 is a side view of an alternative embodiment of an energy delivery system within a cut away/cross sectional view of hybrid train.

FIG. 6 is a side view of an alternative embodiment of an energy delivery system within a cut away/cross sectional view of hybrid train.

Like reference numerals refer to like parts throughout the several views of the drawings.

DETAILED DESCRIPTION

Figures 1, 2:
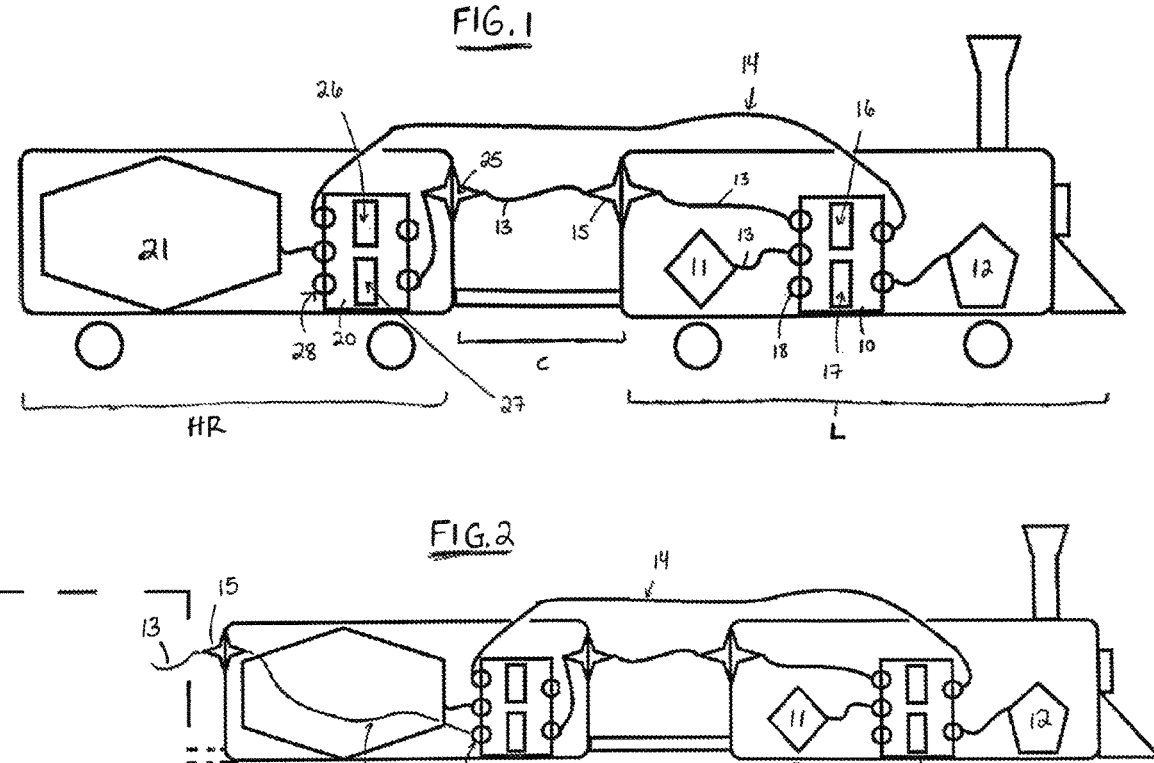
FIG. 1 is a side view of one embodiment of an energy delivery system within a cut away/cross sectional view of hybrid train.
FIG. 2 is a side view of an alternative embodiment of an energy delivery system within a cut away/cross sectional view of a hybrid train.

Turning now descriptively to the figures, FIG. 1 illustrates one embodiment of an energy delivery system within/while connected to a hybrid train from a side view wherein a view of the hybrid train is a cut away/cross sectional view thereof.

In FIG. 1, a locomotive L can be seen. The locomotive L may be a diesel-electric locomotive or a dual-mode (electro-diesel, electro-alternative biofuel, electro-natural gas, electro-steam, or electro-hydrogen) locomotive. The locomotive L may house at least one first converter 10, at least one electric motor 11, at least one engine unit 12, cabling 13 (which may begin/end within an enclosed portion of a locative L and extend to an outer portion of a locomotive L), at least one wiring system 14 (which may begin/end within an enclosed portion of a locomotive L and extend to an outer portion of a locomotive L), and at least one head-end power connector 15. Housing may mean enclosed in a structure or may mean affixed to or integrated into a structure. The at least one first converter 10 may be electrically connected to the at least one electric motor 11, the at least one engine unit 12, cabling 13, at least one wiring system 14, and/or the at least one head-end power connector 15. The at least one first converter may comprise at least one communication device 16, at least one computing device 17, and at least one connection point 18. As the at least one first converter 10 may be electrically connected to the elements described above, the electrical connection(s) may be established through the at least one connection point 18 located on the at least one first converter 10 having cabling 13, at least one wiring system 14, another form of cabling, wiring, connector, plug (such as a three phase plug/socket), terminal, or combinations/permutations thereof in connection therewith so as to carry electricity to or from the at least one first converter 10. Such cabling, wiring, connector, plug, terminal, or combinations/permutations thereof, to allow for electrical connection may also be operable to send communication signals in addition to power over the same. As such, such cabling, wiring, connector, plug, or terminal may have a construction of dual/multi-cable construction or dual/multi-pin construction.

With continued reference to FIG. 1, the at least one electric motor 11 may be, at its core, a motor that converts electrical energy to mechanical energy such that the locomotive L may be propelled. However, the electric motor 11 may be capable of regenerative braking. That said, the at least one electric motor 11 may be a traction motor operative to propel the locomotive L (and anything that might be connected by a connection C or a series of connections C to the locomotive L). While the at least one first converter 10 may be electrically connected to the at least one electric motor 11, the at least one first converter 10 may be operative to transmit electricity to said at least one electric motor 11 so as to power the at least one electric motor 11. As the at least one electric motor 11 may be operative to conduct regenerative braking, the at least one electric motor 11 may transmit electricity to the at least one first converter 10. In addition, the at least one electric motor 11 may have a suite of sensors such as speed sensors, temperature sensors, and current and voltage sensors, each which produce sensor data. Such sensor data may be relayed to the at least one first converter 10, via wired or wireless means, for further processing where such further processing will be subsequently described. Notably, the sensor data may be communicated to the first converter 10 through the electrical connection as described above (for example, through at least one connection point 18) and to the at least one communication device 16 and/or the at least one computing device 17. That said, the at least one first converter 10 may throttle the electricity sent to the at least one electric motor 11 at least in part based on the sensor data (which may thus alter the speed of the electric motor 11). Further, depending on the sensor data, or simply, the desire of the locomotive L to change or maintain speed (as determined by, for example, a conductor), the at least one first converter 10 may transmit electricity to the at least one electric motor 11 via AC current, DC current, pulse width modulation, or combinations thereof. As such, the at least one first converter 10 may be comprised of devices or components, as will be subsequently described, to allow for such transmission of electricity.

With continued reference to FIG. 1, the at least one engine unit 12, may be, at its core, an engine that drives a generator or an alternator which may then move energy through a rectifier, in sum, delivering electricity to an output. In the present disclosure, the output may be the at least one first converter 10. As such, the at least one engine unit 12 may comprise a chemically driven engine (such as a steam engine, a diesel engine, a gasoline engine, a coal engine, a biofuel engine, a natural gas engine, or a hydrogen engine) that may be started by an electric starter. As this chemically driven engine produces output, that output may then pass through a generator or an alternator, which may convert the output into electricity. Thereafter, that electricity may pass through a rectifier, which may then pass to the first converter 10. Such passage of electricity may enter the at least one first converter through at least one connection point 18 on the at least one first converter 10. Notably, depending on at least the energy received by the first converter 10 from the engine unit 12, the first converter 10 may leverage its at least one communication device 16 and/or at least one computing device 17 to throttle the rate at which electricity is produced by the at least one engine unit 12. Should the at least one first converter 10 determine that no electricity is needed from the at least one engine unit 12 (because electricity is being provided to the at least on first converter 10 by other means as will become apparent, the at least one first converter 10 may shut the at least one engine unit 12 off or keep the engine unit at idle). As such, and as should be apparent, the at least one first converter 10 may be in communicative orientation with the at least one engine unit 12, wherein the engine unit 12 may comprise at least one communication device. Notably, communication between the at least one first converter 10 and the at least one engine unit 12 may be effectuated through sending signals through the electrical connection between the first converter 10 and the engine unit 12. Alternatively, communication between the at least one first converter 10 and the at least one engine unit 12 may be effectuated through wireless communications.

Cabling 13, may be a cable or series of cables of different forms to transmit or carry electricity or communication signals. Cabling 13, may, but need not become electrified through energy produced, at least in part by at least one engine unit 12 (after passage through a first converter 10). Generally, cabling 13 may become electrified through a converter of the energy transfer system. Cabling 13 may connect many various portions of the elements disclosed herein (for example, the at least one first converter 10 to the at least one electric motor 11). In addition, cabling 13 may run from the locomotive (including within the locomotive) to other railcars. In other words, cabling may run the entire length of a train wherein a train is a locomotive connected to a series of railcars. As such, cabling 13 may connect (via electrical connection and via a communicative connection) components/elements described in the locomotive L to components/elements of the present disclosures in, on, or near other railcars as will be subsequently described. Cabling 13 may, but need not, pass through or be integrated into connections C (as will be subsequently described). That said, any cabling 13 or portion thereof that will transport electricity may have a voltage rating of at least one thousand volts. However, cabling 13 may be adapted to any physically possible voltage rating. Again, and as previously stated, cabling may also transport communication signals. Moreover, cabling 13 may allow electricity to flow between connected railcars in a series S (or a railcar to a locomotive L) through at least one head-end power connector 15.

The present disclosure may allow for more than one head-end power connector 15 to exist on a railcar. For example, four head-end power connectors 15 may exist on a railcar. Then cabling 13 (of four different sets of cables) may connect that railcar to another railcar (or a locomotive L) with four corresponding head-end power connectors 15. In such an example, four thousand volts or more depending on the waveform of electricity passing through (the maximum of four cablings 13) could be moved through cabling 13 between railcars or between a railcar and a locomotive L (should each cabling 13 have a maximum voltage rating of one thousand volts). Of course, in such an example, more than four thousand volts of electricity may pass through cabling 13 should cabling 13 have a voltage rating higher than one thousand volts per cable. Again, cabling 13 may simply also connect components/elements of the present disclosure together, thereby making them electrically connected. For example, as depicted in FIG. 1, cabling 13 may electrically connect the at least one electric motor 11 and the at least one first converter 10. As may be apparent, "components/elements" may include numbered components described herein.

The at least one head-end power connector 15, may be a connector that allows for electricity and/or communication signals to pass through and be distributed in accordance with the pinning on the at least one head-end power connector 15. As such, the at least one head-end power connector 15 may allow for electricity and communication signals to be distributed to various components/elements of a railcar or a locomotive L. Some of these components/elements will be subsequently described. However, by way of example, at least one head-end power connector 15 may allow electricity to flow from cabling 13 and pass therethrough, where some electricity may then be distributed to subsequent cabling 13 to power basic systems on a railcar such as, but not limited to, lighting, air-conditioning, or electric motors (for example, for railcar doors). Concurrently in this aforementioned example, another head-end power connector 15 (or the same head-end power connector 15) upon the same railcar may allow communication signals to pass from cabling 13 situated outside the railcar through the head-end power connector 15, through cabling situated inside or alongside the railcar 13, through another head-end power connector 15 (which may be located on an opposite side of a railcar to the first head-end power connector 15 mentioned), to alternative cabling 13 situated outside the railcar (which may be located on an opposite side of a railcar to the first cabling 13 situated outside the railcar mentioned). In effect, electricity or communication signals may pass through cabling 13, through at least one head-end power connector 15 situated on or within a railcar or locomotive L, through cabling 13 on or within a railcar or locomotive L (powering with or communicating with various electronics within the railcar or locomotive), then optionally through another head-end power connector 15 to cabling 13 outside the railcar. This effect allows for head-end power connectors 15 to be a link for electricity and communication signals to move through a train and entire series S (as will be subsequently described) as is standard for most trains and railcars. Such an example becomes apparent with brief reference to at least FIG. 5. Head-end power connectors 15 may be, but are not limited to power limit ratings of four hundred eighty volts, four hundred amps, as is standard for head-end power connectors 15 on trains in the United States. However, head-end power connectors 15 may be adapted to any physically possible power limit.

As such, and as previously described, assuming cabling 13 exists at one point along a train (wherein the cabling 13 receives electricity input) with four sets of cables, each set connecting to one of four head-end power connectors 15 on a railcar, cabling 13 then passes through the railcar (where four sets of cables may emerge from each head-end power connector 15, merge into one cable then break back up into four sets of cable, remain as four sets of cable, or break up into multiple sets of cable and merge to again form four sets of cable within or alongside the railcar) to connect to four other head-end power connectors 15 on an opposite end of the railcar, where multiple iterations of this example exists throughout a train, eventually ending at a locomotive L or final railcar, it is possible for well over five Megawatts of power to flow throughout a train (over a series S, as subsequently described). Moreover, it should be noted that depending on how electricity is transferred through this description (for example, sinusoidal wave functions versus non-sinusoidal wave functions) more or less than five Megawatts of power may flow throughout a train. Notably, as more or less than five Megawatts of power may flow throughout at train as sinusoidal wave functions (which inherently encompasses AC current or DC current in a constant wave function and where utilization thereof is subsequently described), such electricity flowing throughout a train may have peak values of voltage (and therefore power) based on the square root of two times the root mean square voltage.

For purposes of this disclosure, the aforementioned set up of at least four sets of cabling 13 starting at one point on a train, passing through at least four head-end power connectors 15, cabling 13 through at least one railcar, through four more head-end power connectors 15, and ultimately ending at a locomotive L (or the opposite way, from a locomotive L to the last railcar in a train or railcar in a series S), will be referred to as a "propulsion powered set up" as will be subsequently described in more detail. However, notably, the propulsion powered set up need not require a wiring system 14 (as will also be subsequently described). As should be apparent and as will be further expanded on, the propulsion powered set up may extend through an entire series S of a train to or from a locomotive L. However, it should be noted that a propulsion powered set up would not require a wiring system 14 for the energy delivery system.

The energy delivery system may, but need not comprise a wiring system 14. The at least one wiring system 14 may be wiring that transmits electricity and communication signals from at least one second converter 20 (as will be subsequently described) to a first converter 10 or vice versa. Such a wiring system 14 may have a high enough voltage and amperage limit so as to have an ability to transport at least five Megawatts of power from at least one second converter 20 to a first converter 10. Such a wiring system 14 may also be constructed of dual/multi-cable construction or dual/multi-pin construction so as to allow the wiring system 14 to transmit communication signals between converters. In addition, the wiring system 14 may attach at connection points 18/28 at a first converter 10 and a second converter 20. The wiring system 14 may traverse the entire length of the train (for example, along an entire series S), should at least one second converter 20 be located at the last railcar of a train. As multiple second converters 20 may exist as part of the present disclosure, the wiring system 14 may have at least one tap or tapping point to allow another second converter to transmit electricity or communication signals along the wiring system 14 and to the first converter 10 (as is not be depicted in the figures). As should be apparent, the wiring system 14 may allow for the first converter 10 to transmit electricity and communication signals to the second converter(s) 20.

Per FIG. 1, the locomotive L may be connected to other railcars, such as at least one hybrid railcar HR. The locomotive L may be connected to other railcars (and other railcars connected to themselves) through a connection C. The connection C may be a janney coupler (AAR coupler or knuckle coupler), a screw coupling, an SA3 coupler a buffer and chain, a control bus connector, jumper connector, or Scharfenberg coupler. While not depicted, connections C may allow cabling 13 to pass therethrough or thereon, and connections C may begin and/or end with at least one head-end power connector 15. While the locomotive L may be connected to other railcars, FIG. 1 depicts the locomotive L as connected to a hybrid railcar HR via a connection C. Turning to FIG. 2, it can be seen that a locomotive L may be connected to a hybrid railcar HR through a connection C. Thereafter, a hybrid railcar HR may be connected to a series S of other railcars (each connected together by a connection C). The series S may be any number of railcars not exceeding 800 railcars. The series S may comprise any form of railcar including, but not limited to other hybrid railcars, flatcars (which, in and of themselves are railcars), flatcars with energy storage containers 30 (as will be subsequently described and which may be described as a flatcar with energy storage container FRC) wherein at least one energy storage container 30 is secured to the flatcar or sitting atop a flatcar, carriages, coaches, wagons, freight cars, boxcars, tank cars, hopper cars, cabooses, gondolas, sleeping cars, dining cars, container cars, stock cars, or refrigerator cars.

Figure 4:
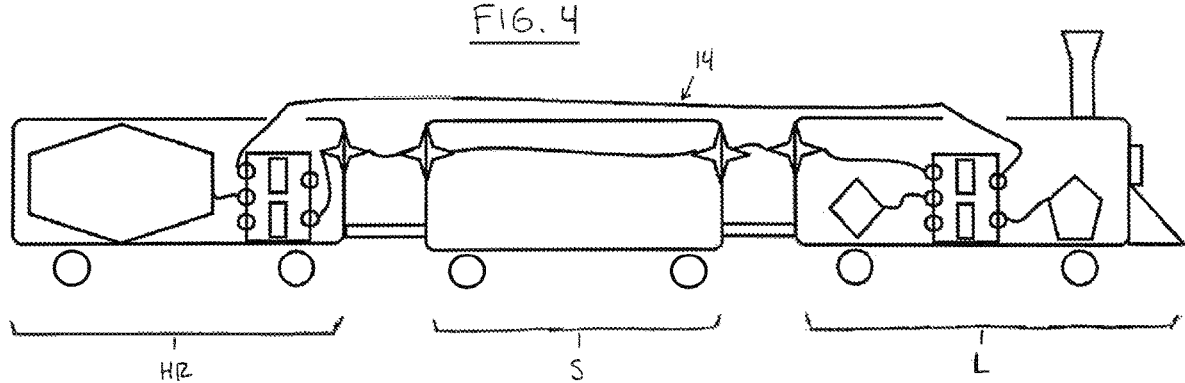
FIG. 4 is a side view of an alternative embodiment of an energy delivery system within a cut away/cross sectional view of hybrid train.

As depicted in FIG. 2, should any railcar in the series S comprise a hybrid railcar HR or a flatcar with energy storage container FRC thereon, a wiring system 14 may, but need not, emanate from the hybrid railcar(s) HR and/or flatcar(s) with energy storage containers FRC, and such wiring systems 14 may join together a at least one tap or tapping point so as to ultimately joining wiring systems 14 with the hybrid railcar HR as may be inferred from the above description of FIG. 2. To this end, reference to FIG. 4 or FIG. 9 may be had, where a hybrid railcar HR (or flatcar with energy storage container FRC thereon) is depicted as the last (but need not be last) in a series S. However, and notably, the taps or tapping points of a wiring system 14 are not depicted in the figures. The wiring system 14 may traverse the entire length of the train to the locomotive L. Should any railcar in the series S in-between the hybrid railcar HR (or flatcar with energy storage container FRC thereon) and the locomotive L be another hybrid railcar HR or a flatcar with energy storage container FRC, these railcars may have wiring systems 14 emanating therefrom and tap into at least one tap or tap point onto the depicted wiring system 14.

Notably, each railcar in the series S may require power/electricity. As such, cabling 13 originating from at least one first converter 10 or at least one second converter 20 may extend to each railcar (potentially passing through at least one head-end power connector 15 at each railcar in series S, where a hybrid railcar HR or flatcar with energy storage container FRC thereon may be a part of a series S), thereby powering each railcar (via electricity generated by at least one engine unit 12 or via electricity originating from at least one battery pack 21 as will be subsequently described).

Figure 3:
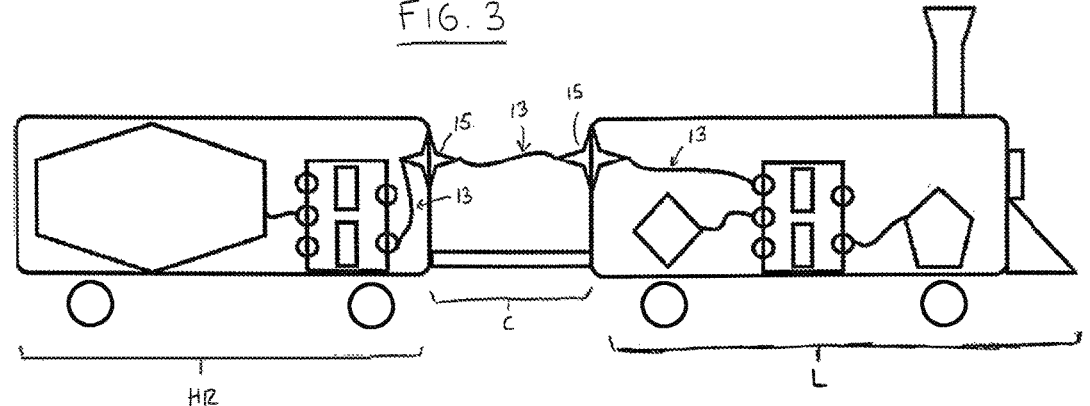
FIG. 3 is a side view of an alternative embodiment of an energy delivery system within a cut away/cross sectional view of hybrid train.

With brief reference to FIG. 3, it may be noted that a hybrid railcar HR may be connected through a connection C to a locomotive L as previously described. Notably, also as previously described, FIG. 3 does not depict a wiring system 14 extending from the hybrid railcar HR to the locomotive L. In such an instance, the locomotive L may obtain all necessary electricity/power (as will be subsequently described) from cabling 13 passing through at least one head-end power connector 15, meaning, through the aforementioned propulsion power set up term. As such, FIG. 3 depicts an embodiment of the propulsion powered set up as will be subsequently described in more detail. While not depicted, a series S may follow the hybrid railcar HR as shown in FIG. 3. To this end, FIGS. 6, 8, and 10 also depict the propulsion powered set up. In each of those figures, a series S may exist in-between or after where a connection C may exist.

Figure 8:
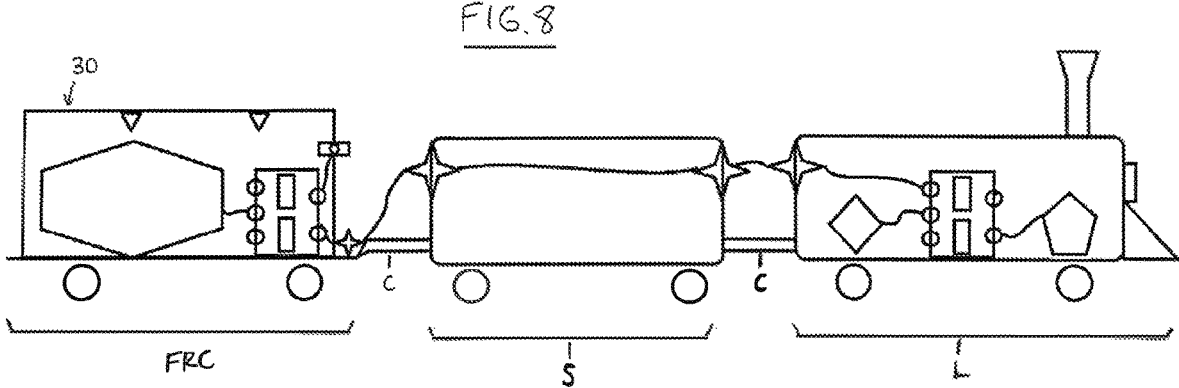
FIG. 8 is a side view of an alternative embodiment of an energy delivery system within a cut away/cross sectional view of hybrid train.
Figure 9:
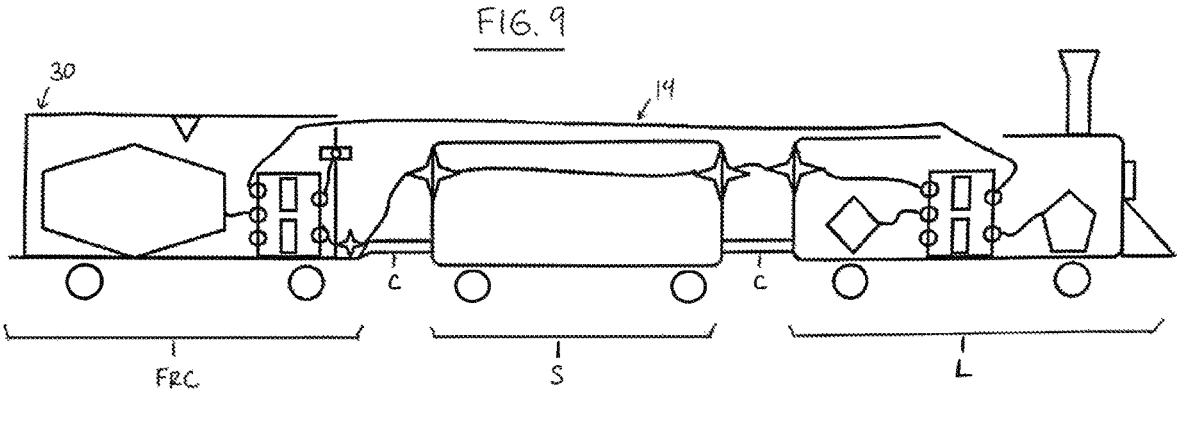
FIG. 9 is a side view of an alternative embodiment of an energy delivery system within a cut away/cross sectional view of hybrid train.
Figure 10:
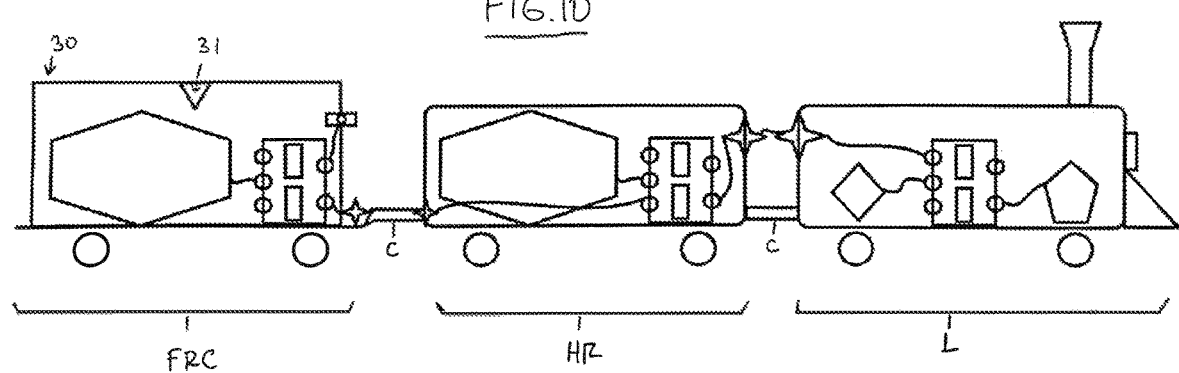
FIG. 10 is a side view of an alternative embodiment of an energy delivery system within a cut away/cross sectional view of hybrid train.

Notably, the descriptions of FIGS. 6-10 are similar to those above, however, FIGS. 6-10 make use of a flatcar with energy storage container FRC. In such figures, and as is depicted in FIG. 10, the flatcar with energy storage container may exist in series S (not depicted in FIG. 10) with a hybrid railcar HR.

As such, housed within a hybrid railcar HR may be at least one second converter 20, at least one wiring system 14 (which may begin/end within an enclosed portion of a hybrid railcar HR and extend to an outer portion of a hybrid railcar HR), at least one energy pack 21, cabling 13 (which may begin/end within an enclosed portion of a hybrid railcar HR and extend to an outer portion of a hybrid railcar HR), and at least one head-end power connector 15. The at least one second converter 20 may comprise at least one communication device 26, at least one computing device 27, and at least one connection point 28. The at least one second converter 20 may be electrically connected to the at least one energy pack 21, cabling 13, at least one wiring system 14, and/or the at least one head-end power connector 15. As the at least one second converter 20 may be electrically connected to the elements described above, the electrical connection(s) may be established through the at least one connection point 28 located on the at least one second converter 20 having cabling 13, at least one wiring system 14, another form of cabling, wiring, connector, plug (such as a three phase plug/socket), terminal, or combinations/permutations thereof in connection therewith so as to carry electricity to or from the at least one second converter 20. Such cabling, wiring, connector, plug, terminal, or combinations/permutations thereof, to allow for electrical connection may also be operable to send communication signals in addition to power over the same. As such, such cabling, wiring, connector, plug, or terminal may have a construction of dual/multi-cable construction or dual/multi-pin construction.

A flatcar with energy storage container FRC may allow for an energy storage container 30 to exist thereon or sit atop the flatcar. As previously mentioned, more than one energy storage container 30 may exist on a flatcar or sit atop the flatcar. Housed within an energy storage container 30 may be at least one second converter 20, at least one wiring system 14 (which may begin/end within an enclosed portion of an energy storage container 30 and extend to an outer portion of an energy storage container 30), at least one energy pack 21, cabling 13 (which may begin/end within an enclosed portion of an energy storage container 30 and extend to an outer portion of an energy storage container 30), and at least one head-end power connector 15. Alternatively, the at least one head-end power connector may be affixed to, formed in a flatcar that the energy storage container 30 may exist or sit on. The at least one second converter 20 may comprise at least one communication device 26, at least one computing device 27, and at least one connection point 28. The at least one second converter 20 may be electrically connected to the at least one energy pack 21, cabling 13, at least one wiring system 14, and/or the at least one head-end power connector 15. As the at least one second converter 20 may be electrically connected to the elements described above, the electrical connection(s) may be established through the at least one connection point 28 located on the at least one second converter 20 having cabling 13, at least one wiring system 14, another form of cabling, wiring, connector, plug (such as a three phase plug/socket), terminal, or combinations/permutations thereof in connection therewith so as to carry electricity to or from the at least one second converter 20. Such cabling, wiring, connector, plug, terminal, or combinations/permutations thereof, to allow for electrical connection may also be operable to send communication signals in addition to power over the same. As such, such cabling, wiring, connector, plug, or terminal may have a construction of dual/multi-cable construction or dual/multi-pin construction.

Figure 11:
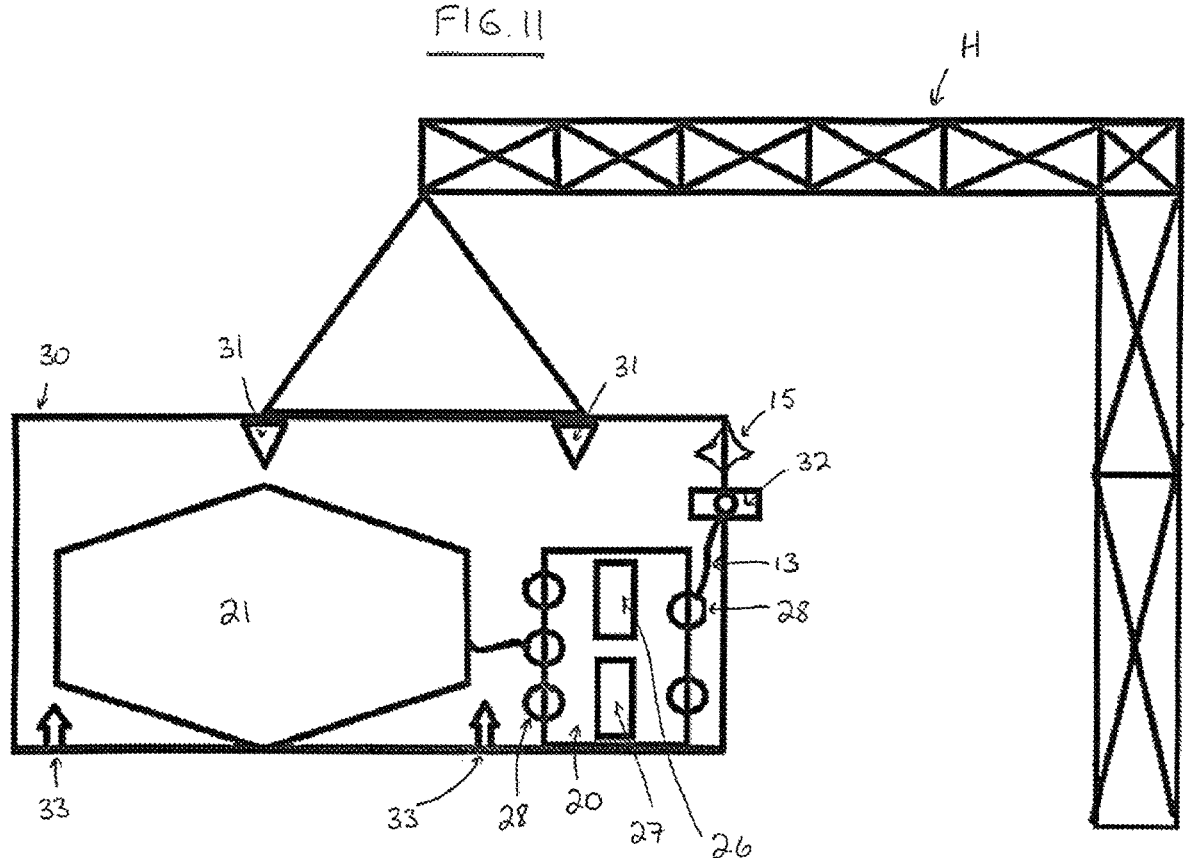
FIG. 11 is a side view of an energy delivery system's energy storage container in transport/while being hoisted.

Further, with reference to FIG. 11, the energy storage container 30 may comprise at least one hoist point 31, at least one power inlet 32, and at least one attachment point 33. A hoist point 31 may be configured and dimensioned to allow for the energy storage container to be hoisted into the air by a hoisting device/system H (such as a crane or forklift). As such, a hoist point 31 may be, but is not limited to being a D-ring, a clevis hook, a lifting eye, a lift sling, a corner casting, a lifting lung, a forklift pocket, a grapple system, a chain hook, or recessed anchor. A hoist point 31 may physically exist anywhere on a surface of an energy storage container 30, or may be formed on the surface of an energy storage container 30.

An attachment point 33 may be configured and dimensioned to allow for the energy storage container 30 to be attached and secured to a flatcar or railcar. A hoist point 31 may also function as an attachment point 33, or be configured and dimensioned to perform the same function as an attachment point 33. That said, attachment points 33 may be described as, but are not limited to, a locking pin, a bolt-down bracket, a lashing ring, a cleat or chock, a chain and rachet tie-down, a tensioned cable or strap, a magnetic lock, or a clamping system.

The at least one power inlet 32 may be an inlet formed on the surface of or integrated into an energy storage container 30, comprising an electrical inlet which is electrically connected to a second converter 20. The electrical inlet may be, but is not limited to an XT connector, C-rated connector, Anderson connector, IEC 60309, GB/T, or CCS connector. The at least one power inlet 32 may be an aperture traversing from the exterior of the energy storage container 30 to the interior thereof and aligned with a second converter's 20 connection point 28. The at least one power inlet 32 may be operable to allow for electricity and communication signals to flow into a second converter 20 and ultimately to at least one energy pack 21 so as to charge the energy pack 21. As such, the at least one power inlet 32 allows for a second converter 20 to receive electricity input. The second converter 20 may then, as will be subsequently described, alter properties of such electricity input and transmit such input to the energy pack 21.

Figure 12:
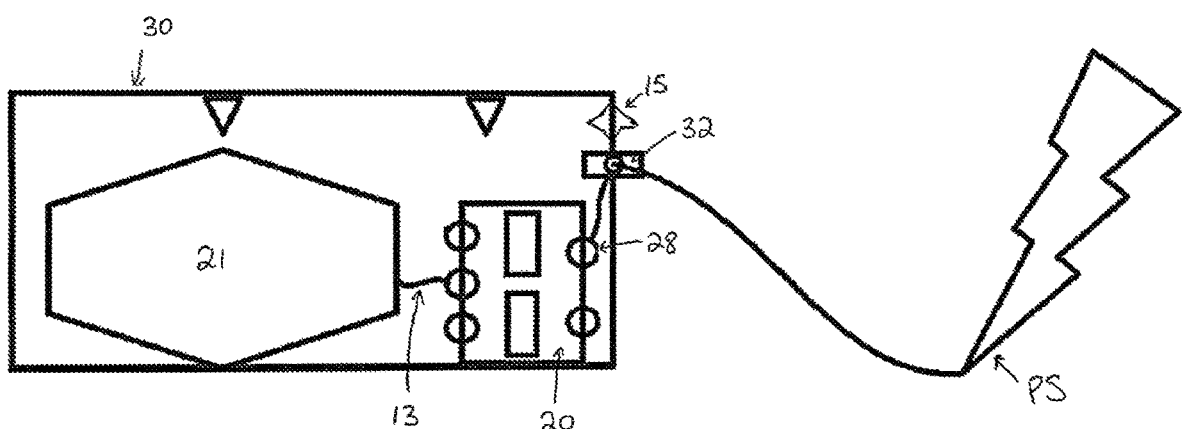
FIG. 12 is a side view of an energy delivery system's energy storage container connected to a power source.

As depicted in FIG. 12, a power source PS, which may be, but is not limited to a renewable or non-renewable energy source such as a solar panel (or solar panel array) optionally connected to a battery, a battery, a wind turbine, a hydro-electric generator, a geothermal generator, a natural gas generator, a coal power plant, a nuclear power plant, a diesel generator, an oil power plant, an electrical grid, or an electrical outlet, may transmit electricity to the energy storage container 30 (and its energy pack 21) through the at least one power inlet 32.

As such, an energy storage container 30 (perhaps with a depleted energy pack 21) may be detachable and removed from a flatcar of a train, where another energy storage container 30 (with a charged energy pack 21) may be placed and attached to a flatcar of a train. Notably, once detached (but without the need for being detached) from a railcar, an energy storage container 30 may have its energy pack 21 charged through a power source PS.

As such, it should be noted that a hybrid railcar HR (perhaps with a depleted energy pack 21) may be detachable and removed from a series S of train (at, for example, at train station), where another hybrid railcar HR (perhaps with a charged energy pack 21) may replace the previous hybrid railcar HR and integrated into a series S of a train. Notably, once removed (but without the need for being removed) from a series S, a hybrid railcar HR may have its energy pack 21 charged through a power source PS (as is not depicted). In such an instance, the power source PS may connect to a connection point 28 of a second converter 20 so as to transfer electricity into the second converter 20 and ultimately the energy pack 21.

As such, within either a hybrid railcar HR or an energy storage container 30, at least one energy pack 21 may exist. The energy pack 21 may be, but is not limited to, a battery, battery pack, hydrogen fuel cell, pumped hydro storage, compressed air energy storage, molten salt storage, ice storage, superconducting magnetic energy storage device, or device otherwise known for being rechargeable and store energy. The energy pack 21 may have a battery management system integrated therein, which may communicate with a second converter 20. As should be apparent, a hybrid railcar HR or an energy storage container 30 may house more than one energy pack 21, and more than one energy pack 21 may group together within a hybrid railcar HR or energy storage container 30 so as to form larger energy storage than just one energy pack 21. The at least one energy pack 21 may be electrically connected to a second converter 20 by cabling 13 which can transmit energy and communication signals to and from the energy pack 21. As should be apparent, the energy pack 21 may be charged at least in part through electricity sent to it from at least one second converter 20.

As previously described, a wiring system 14 may emanate/terminate from at least one second converter 20, meaning that the wiring system may pass through an exterior of a hybrid railcar HR or energy storage container 30. The wiring system 14 may become electrified at least in part through the energy stored in an energy pack 21 (after such energy has passed through a second converter 20). Alternatively, the wiring system 14 may become electrified by the first converter 10.

As mentioned briefly before, as each railcar in a series S may require power/electricity, cabling 13 may originate from a second converter 20 and extend to each railcar in a series S (perhaps in a propulsion powered set up, or by passing through head-end power connectors 15 and other cabling 13, each at one point reaching a locomotive L). Alternatively, cabling 13 may originate from a first converter 10 and extend to each railcar in a series S, at one point reaching a hybrid railcar HR, energy storage container 30, or final railcar in a series. Such cabling 13 may become electrified at least in part by the energy from a power source PS or stored in the energy pack 21 after such energy has passed through a second converter 20. Alternatively, such cabling 13 may become electrified at least in part by energy emanating from a first converter 10.

Now, turning descriptively to the converters (first and second converter 10/20). Each converter may have a communication device 16/26 and computing device 17/27. Moreover, each converter 10/20 may be structured to take at least one input electricity and convert (but need not convert) such electricity into different currents, waveforms, voltages, amperages, or otherwise manipulatable characteristics of electricity, and output the electricity. In other words, the converters 10/20 may be capable of transmitting electricity wherein electricity carries a multitude of currents and waveforms (IE capable of pulse width modulation, signal superposition, biasing and amplification, and enhanced signal detection) as well as novel waveforms.

Inherent in such structuring, each converter 10/20 may have sensors able to measure the aforementioned characteristics of electricity. To this end, a converter 10/20 may comprise switching devices including, but not limited to insulated gate bipolar transistors, metal-oxide-semiconductor field-effect transistors, diodes, and/or thyristors, and/or control circuitry, including, but not limited to, DC output, AC output, pulse width modulation output, modulators, demodulators, filters, feedback mechanisms, gate drive circuitry, and/or protection circuitry.

The communication devices 16/26 may allow for each converter 10/20 to communicate with one another via signals. As should be apparent, such communication devices 16/26 should be structured to receive (and decode) and sent (and encode) communication signals. Such communication signals may include data such as resource data and demand data. As may be apparent, data may be quantifiable and change over time. Broadly, resource data may be energy figures which are traversing throughout a series S and/or emanating from the energy pack 21. Whereas demand data may be emanating from a conductor requesting quantifiable figures of power, emanating from the at least one electric motor 11 (sensor data), emanating from the at least one engine unit 12, requested by a converter 10/20, or emanating from any devices located on a series S of a train (such as electronics, lighting, air conditioning).

As should also be apparent, such signals may be communicated to each converter 10/20 via wired connection through cabling 13 or a wiring system 14. To this end, any communication signals may be communicated to a converter 10/20 in a wired fashion, through cabling 13 or a wiring system 14, or via wireless means.

Each communication device 16/26 may have a unique identification code such that, for example, the first converter 10 may be recognized as a first converter 10 by at least one second converter 20 (the opposite is also true). This unique identification code may thus allow for electricity to be transmitted to or from either the first converter 10, second converter 20, or both, to/from one another, or to/from the various components/elements identified (including the energy pack 21) upon recognition of such unique identifier code. By way of non-limiting example, as a second converter 20 may take in electricity from a power source PS, at the time the second converter 20 is taking in power from the power source PS, the second converter 20 may not be in communication with a first converter 10 (as the second converter 20 may not be recognizing a first converter's 10 unique identification code), and may cease to transmit any electricity (other than to an energy pack 21) thus remaining in an idle state, or transmit electricity in a specified form across cabling 13, by way of example, sinusoidal wave form, which might ultimately reach a first converter 10. That said, should a first converter 10 receive electricity in this form, the first converter 10 may remain in an idle state and transmit no electricity. Should a first converter 10 be taking in power while not in communication with a second converter 20, the first converter 10 may cease to transmit any electricity thus remaining in an idle state, or transmit electricity in a specified form across cabling 13, by way of example, sinusoidal wave form, which might ultimately reach a second converter 20. That said, should a second converter 20 receive electricity in this form, the second converter 20 may remain in an idle state and transmit no electricity.

As should be apparent, converters 10/20 may communicate with the various components/elements identified without communicating with another converter 10/20. For example, a first converter 10 may communicate with at least one electric motor 11, and/or at least one engine unit 12 without communicating with at least one second converter 20. Additionally, a second converter 20 may communicate with an energy pack 21 or power source PS without communicating with a first converter 10. Notably, converters 10/20 may submit communication signals to each other for processing by each's respective computing device 17/27.

The computing devices 17/27 may also be known as control devices. Notably, computing devices 17/27 may process communication signals received by the communication devices 16/26 or format communication signals to be sent by the communication devices 16/26, including sending and receiving unique identifier codes. Computing devices 17/27 may control the various switching devices and/or control circuitry of the converters 10/20. To this end, and again, a converter 10/20 may comprise switching devices including, but not limited to insulated gate bipolar transistors, metal-oxide-semiconductor field-effect transistors, diodes, and/or thyristors, and/or control circuitry, including, but not limited to, DC output, AC output, pulse width modulation output, filters, feedback mechanisms, gate drive circuitry, and/or protection circuitry. Computing devices 17/27 may control such switching devices or control circuitry in response to processing data communicated to communication devices 16/26. As such, computing devices 17/27 can enable and control converters 10/20 to select between inputting and outputting electricity at different voltages, in different states, currents, wave forms etc.

As should be apparent, computing devices 17/27 may process such data so as to meet demands of a train (IE power required, to keep up speed, to keep on-board electronics powered, etc). To this end, computing devices 17/27 may, but need not have a memory of information by which the computing devices 17/27 may compare data for processing purposes or to determine how to control the converters 10/20. Computing devices 17/27 may also thus be structured to send data to the converters 10/20 such that the converters 10/20 alter electricity input/output. As such, and as should be apparent, computing devices 17/27 are, in addition to the capabilities described above, also capable of, and not limited to, controlling the converters 10/20 such that the converters 10/20 are capable of, and not limited to, power factor correction, adaptive power delivery grid balancing and demand response, variable frequency drive control, and safety and fault detection.

Figure 7:
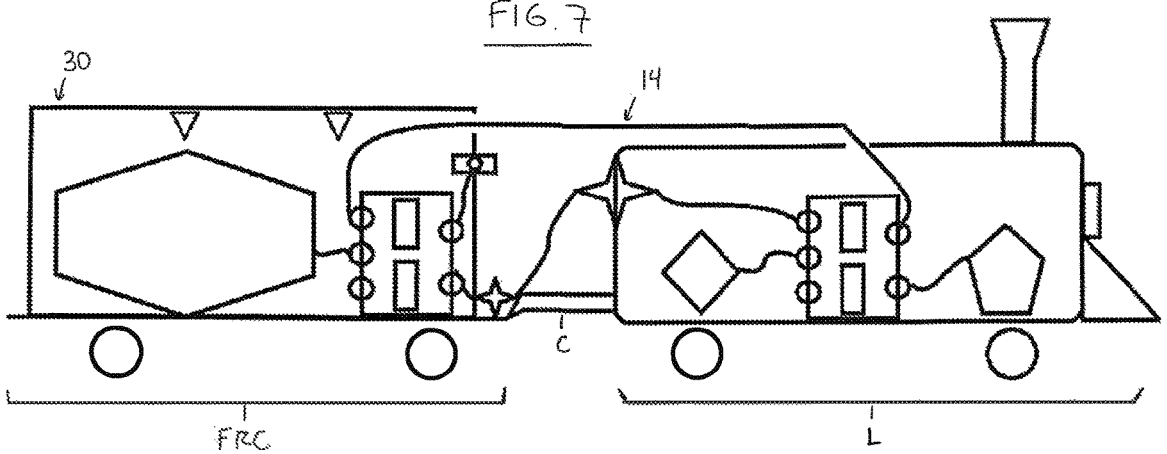
FIG. 7 is a side view of an alternative embodiment of an energy delivery system within a cut away view/cross sectional of hybrid train.

To further illustrate the energy delivery system, reference to FIG. 1 and FIG. 7 may be had. For this illustration, reference to FIG. 12 may also be had. The train as depicted or just the energy storage container 30 per FIG. 12 may not be moving. While the train is not moving, electricity input from at least one power source PS may be transmitted to at least one second converter 20. In accordance with FIG. 1, electricity input may be transmitted from a power source PS directly to a second converter's 20 connection point 28. In accordance with FIG. 7, electricity input may be transmitted from a power source PS to a power inlet 32, then to a second converter 20, through a connection point 28. At this point, the second converter's 20 communication device 28 may attempt to communicate with the power source PS. In essence, the second converter 20 may, through the use of both the communication device 26 and the computing device 27, attempt to determine if the power source PS has a unique identifier code. If the power source PS did have a unique identifier code, the second converter 20 could recognize the power source PS as a power source, and then may take further actions thereafter. That said, the power source PS need not have a unique identifier code for the second converter 20 to take further action.

Actions the second converter 20 could then take include transmitting electricity to the at least one energy pack 21, transmitting electricity through a wiring system 14 (as can be seen in FIGS. 1, 2, 4, 7, and 9) to a first converter 10, transmitting electricity through cabling 13 (as can be seen in FIGS. 3, 5, 6, 8, and 10) and not through a wiring system 14 ultimately to a first converter 10 (thus through a propulsion powered set up), or combinations/permutations thereof.

Notably, more than one second converter 20 may exist in a series S, and thus at least one second converter 20 may carry out these actions while other second converters 20 remain idle. Other second converters 20 may be activated when a second converter 20 is no longer able to transmit electricity either because it is not able to receive power from a power source PS or energy pack 21. Additionally, an action the first converter 10 could take includes transmitting electricity through cabling 13 or a wiring system 14 and ultimately to a second converter 20 (as will be subsequently described, but in essence, the first converter 10 may transmit electricity derived from an engine unit(s) 12 to the second converter 20, which may then transmit such electricity to the energy pack 21, charging the energy pack even if a second converter 20 is connected to a power source PS).

As such, to transmit electricity to at least one energy pack 21, the communication device 26, paired with the computing device 27 may also communicate with an energy pack's 21 battery management system. In doing so, the battery management system may communicate resource data with the communication device 26. The computing device 27 may then determine the energy pack's 21 state of charge and the power source's PS ability to provide electricity in the specified format for the energy pack 21, If needed, the second converter 20, through at the direction of the computing device 27, may alter the electricity input's (from the power source PS) characteristics, such as, but not limited to current or voltage. Alterations may occur at any time the power source is giving electricity input to the second converter 20. When or if the battery management system communicates resource data with the communication device 26 to alter the second converter 20 that the energy pack 21 is at a full capacity, the converter may stop the flow of electricity to the energy pack by way of its computing device 27 controlling switching devices and/or control circuitry of the second converter 20.

Alternatively, or at the same time, the second converter 20 may transmit electricity from a power source PS or the energy pack 21 through the wiring system 14 to the first converter 10. Notably, if a power source PS was not providing electricity to a second converter 21, the second converter 20 could transmit electricity through the wiring system 14 to the first converter as electricity could originate from the energy pack 21. Should the second converter 20 transmit electricity to the first converter 10, the second converter 20 could first communicate with the first converter 10 either through the wiring system 14 or through cabling 13. The communication devices 16/26 would communicate unique identifier codes pertaining to each converter 10/20 to one another through the wiring system 14 or cabling 13. The computing devices 17/27 would process such communication signals to confirm that the unique identifier codes would pertain to either a first converter 10 or a second converter 20.

Thereafter, a link or handshake could be formed between the two converters 10/20. After that, the first converter 10 would be able to communicate demand data, through its communication device 16, such as characteristics of electricity required to power/start up the engine unit(s) 12 or electric motor(s) 11, or resource data which might include power required or requested by devices located on the train. Should such demand data be communicated to the second converter 20, the second converter's 20 computing device 27 could allow for electricity to flow from the energy pack 21 or power source PS through the wiring 14 (and ultimately to the first converter 10) wherein the computing device 27 could leverage the second converter's 20 switching devices and control circuitry to transmit that electricity with the characteristics requested by the first converter 10. Notably, such demand data may be preprogramed into the first converters computing device 17 as specific power figures required by the engine unit(s) 12 or electric motor(s) 11 for startup.

Figures 5, 6:
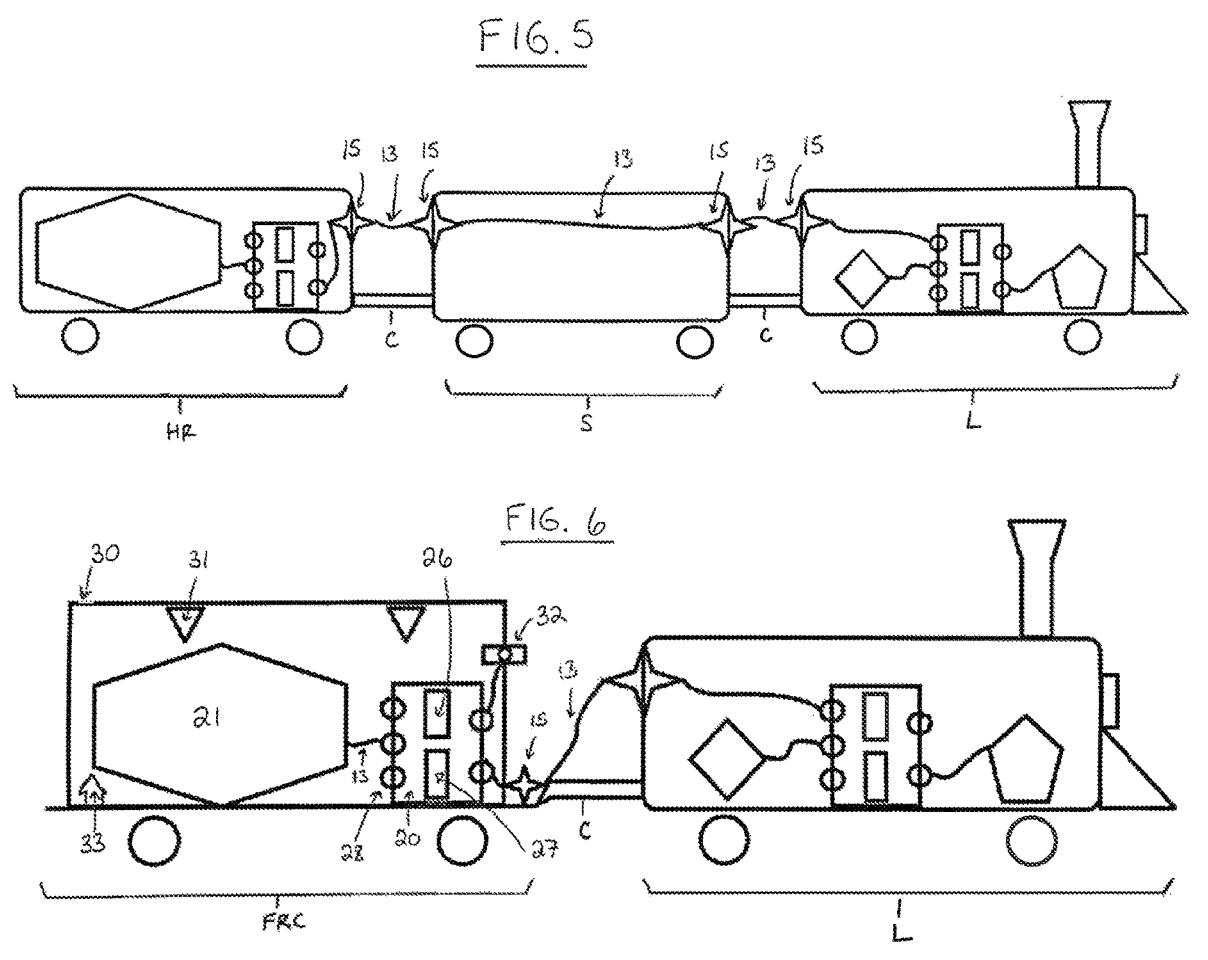

Before a first converter 10 could communicate resource data regarding power required or requested by devices located on a train, the second converter 20 may have already been transmitting electricity through the series S via cabling 13 (as depicted in FIGS. 5, 8, 9, and as may be inferred from the previous description herein stating a series S may exist in any of FIGS. 1-10 in-between a hybrid railcar(s) HR or energy storage container(s) 30 and the locomotive L. As such, the second converter 20 may leverage its computing device 27 to determine characteristics of its electricity output to the series S and cabling 13, and communicate such characteristics to the first converter 10 through the second converter's communication device 26 and cabling 13 or wiring system 14. The first converter 10 may then use its computing device 17 (after receiving communication signal (s) from the second converter 20 through the first converter's 10 communication device 16) to determine if it is receiving electricity from cabling 13, determine the difference in characteristics of electricity received through cabling 13 from the characteristics of electricity output by the second converter 20, or simply the characteristics of electricity received (such as how consistent power figures are over time).

Thereafter, the first converter 10 could use its computing device 17 to determine if enough electricity is being sent through the cabling 13, or if characteristics of electricity could be altered (for example, more or less voltage, or more a consistent power figure). Depending on such measurements, the computing device 17 may communicate, through the communication device 16, a request for the second converter 20 to alter characteristics of electricity which would ultimately flow to the first converter 10.

For example, the second converter 20 may be sending a total of three Megawatts of power in a sinusoidal waveform through the cabling 13. Should the computing device 17 determine the first converter 10 should have more power thereto in a more consistent fashion (perhaps to power devices in the series S), the communication device 16 may make such a request to the second converter 20. Thereafter, the second converter 20, after receiving such a communication through its communication device 26, may have its computing device 27 alter the transmission of electricity through cabling 13 by directing the second converter's 20 switching devices and control circuitry to draw or more voltage or increase voltage output from the energy pack 21 or power source PS. Additionally, the computing device 27 may alter the electricity's waveform from a sinusoidal waveform to another waveform, or superimposed state, which may include more than one sinusoidal waveform (such as a pure sinusoidal waveform and a square sinusoidal waveform), a sinusoidal waveform and non-sinusoidal waveforms, or more than one non-sinusoidal waveforms, as well as novel waveforms. Moreover, the computing device 27 may alter the electricity's current type. Indeed, such an alteration would allow for more power and could allow for a more consistent power delivery to the first converter 10.

As may be inferred from FIGS not depicting a wiring system 14, a wiring system 14 is not a requirement to accomplish the above result. As may be noted, a wiring system 14 may serve as a means for sending electricity directly from a second converter 20 to a first converter 10. In addition, each respective computing device 17/27 may perform the same function. As such, only one computing device 17/27 may be needed, where one converter's 10/20 computing needs may be communicated to another converter 10/20 should at least one converter not comprise a computing device 17/27 (as not depicted).

Assuming a train may begin to be put in motion, be in motion, or be slowing down and not have a hybrid railcar HR or a flatcar with energy storage container FRC connected to a power source PS, actions the second converter 20 could take could include transmitting electricity through a wiring system 14 (as can be seen in FIGS. 1, 2, 4, 7, and 9) to a first converter 10, transmitting electricity through cabling 13 (as can be seen in FIGS. 3, 5, 6, 8, and 10) and not through a wiring system 14 ultimately to a first converter 10 (thus through a propulsion powered set up), or combinations/ permutations thereof.

Notably, more than one second converter 20 may exist in a series S, and thus at least one second converter 20 may carry out these actions while other second converters 20 remain idle. Other second converters 20 may be activated when a second converter 20 is no longer able to transmit electricity it is not able to receive power from an energy pack 21. Additionally, an action the first converter 10 could take includes transmitting electricity through cabling 13 or a wiring system 14 and ultimately to a second converter 20.

As such, the second converter 20 may transmit electricity from the energy pack 21 through the wiring system 14 to the first converter 10. Should the second converter 20 transmit electricity to the first converter 10, the second converter could first communicate with the first converter 10 either through the wiring system 14 or through cabling 13. The communication devices 16/26 would communicate unique identifier codes pertaining to each converter 10/20 to one another through the wiring system 14 or cabling 13. The computing devices 17/27 would process such communication signals to confirm that the unique identifier codes would pertain to either a first converter 10 or a second converter 20.

Thereafter, a link or handshake could be formed between the two converters 10/20. After that, the first converter 10 would be able to communicate demand data, through its communication device 16, such as characteristics of electricity required to power/start up the engine unit(s) 12 or electric motor(s) 11, characteristics of electricity required to maintain, speed up, or slow down electric motor(s) 11, or resource data which might include power required or requested by devices located on the train. Should such demand data be communicated to the second converter 20 (via link or handshake), the second converter's 20 computing device 27 could allow for electricity to flow from the energy pack 21 through the wiring 14 (and ultimately to the first converter 10) wherein the computing device 27 could leverage the second converter's 20 switching devices and control circuitry to transmit that electricity with the characteristics requested by the first converter 10.

Additionally, demand data may be derived from the electric motor(s) 11 sensors, where such sensor data would be communicated from the electric motor(s) 11 to the first converter 10. Further, demand data could be derived based on how much power is flowing to the first converter 10 from the engine unit(s) 12. The computing device 17 may process such sensor data or data from power derived from the engine unit(s) 12, so as to determine electricity characteristics needed to be supplied from the first converter 10 to the electric motor(s) 11 to speed up, slow down, or maintain the electric motor(s) 11 speed. Also, such electricity characteristics needed to be supplied from the first converter 10 to the electric motor(s) 11 to speed up, slow down, or maintain the electric motor(s) 11 speed may be derived from a throttle a conductor may use. Therefore, such demand data be communicated to the second converter 20, the second converter's 20 computing device 27 could allow for electricity to flow from the energy pack 21 through the wiring 14 (and ultimately to the first converter 10) wherein the computing device 27 could leverage the second converter's 20 switching devices and control circuitry to transmit that electricity with the characteristics requested by the first converter 10.

As may be inferred from FIGS not depicting a wiring system 14, a wiring system 14 is not a requirement to accomplish the above result. Indeed, the second converter 20 could allow for electricity (with characteristics requested by the first converter 10 and in a scenario as described above) to flow through cabling 13. Alternatively, the first converter 10 may be able to simply leverage its switching devices and control circuitry to alter the characteristics of the electricity sent to the electric motor(s) as the first converter 10 may also be receiving electricity from the engine unit(s) 12. However, as may be apparent, the energy delivery system may leverage the engine unit(s) 12, thus allowing the first converter 10 to shut the engine unit(s) 12 off, or prevent the engine unit(s) 12 from transmitting any power to the first converter 10. Notably, the second converter 20 may send or alter electricity characteristics to the first converter 10 based on requests for voltage, waveform (such in a sinusoidal waveform or non-sinusoidal waveform, or superimposed state, which may include more than one sinusoidal waveform (such as a pure sinusoidal waveform and a square sinusoidal waveform), a sinusoidal waveform and non-sinusoidal waveforms, or more than one non-sinusoidal waveforms), a novel waveform, or current. Additionally, the first converter 10 may transmit or alter electricity characteristics to the electric motor(s) 11, which may include voltage, waveform (in a sinusoidal waveform or non-sinusoidal waveform, or superimposed state, which may include more than one sinusoidal waveform (such as a pure sinusoidal waveform and a square sinusoidal waveform), a sinusoidal waveform and non-sinusoidal waveforms, or more than one non-sinusoidal waveforms), a novel waveform, or current.

In one instance, before a first converter 10 could communicate resource data regarding power required or requested by devices located on a train, the second converter 20 may have already been transmitting electricity through the series S via cabling 13 (as depicted in FIGS. 5, 8, 9, and as may be inferred from the previous description herein stating a series S may exist in any of FIGS. 1-10 in-between a hybrid railcar(s) HR or energy storage container(s) 30 and the locomotive L. As such, the second converter 20 may leverage its computing device 27 to determine characteristics of its electricity output to the series S and cabling 13, and communicate such characteristics to the first converter 10 through the second converter's communication device 26 and cabling 13 or wiring system 14. The first converter 10 may then use its computing device 17 (after receiving communication signal(s) from the second converter 20 through the first converter's 10 communication device 16) to determine if it is receiving electricity from cabling 13, determine the difference in characteristics of electricity received through cabling 13 from the characteristics of electricity output by the second converter 20, or simply the characteristics of electricity received (such as how consistent power figures are over time).

Thereafter, the first converter 10 could use its computing device 17 to determine if enough electricity is being sent through the cabling 13, or if characteristics of electricity could be altered (for example, more or less voltage, or more a consistent power figure). Depending on such measurements, the computing device 17 may communicate, through the communication device 16, a request for the second converter 20 to alter characteristics of electricity which would ultimately flow to the first converter 10.

For example, the second converter 20 may be sending a total of three megawatts of power in a sinusoidal waveform through the cabling 13. Should the computing device 17 determine the first converter 10 should have more power thereto in a more consistent fashion (perhaps to power devices in the series S), the communication device 16 may make such a request to the second converter 20. Thereafter, the second converter 20, after receiving such a communication through its communication device 26, may have its computing device 27 alter the transmission of electricity through cabling 13 by directing the second converter's 20 switching devices and control circuitry to draw or more voltage or increase voltage output from the energy pack 21 or power source PS. Additionally, the computing device 27 may alter the electricity's waveform from a sinusoidal waveform to another waveform, or superimposed state, which may include more than one sinusoidal waveform (such as a pure sinusoidal waveform and a square sinusoidal waveform), a sinusoidal waveform and non-sinusoidal waveforms, more than one non-sinusoidal waveforms, or a novel waveform. Moreover, the computing device 27 may alter the electricity's current type. Indeed, such an alteration would allow for more power and could allow for a more consistent power delivery to the first converter 10.

As may be inferred from FIGS not depicting a wiring system 14, a wiring system 14 is not a requirement to accomplish the above result. As previously noted, but again, each respective computing device 17/27 may perform the same function. As such, only one computing device 17/27 may be needed, where one converter's 10/20 computing needs may be communicated to another converter 10/20 should at least one converter not comprise a computing device 17/27 (as not depicted).

In another instance, a first converter 10 may be electrified by power transmitted to the first converter 10 from the engine unit(s) 12 or by power transmitted to the first converter 10 from the second converter 20 and through a wiring system 14. Therefore, the first converter 10 may have already been transmitting electricity through the series S via cabling 13 (as depicted in FIGS. 5, 8, 9, and as may be inferred from the previous description herein stating a series S may exist in any of FIGS. 1-10 in-between a hybrid railcar(s) HR or energy storage container(s) 30) and to a second converter 20. As such, the first converter 10 may leverage its computing device 17 to determine characteristics of its electricity output to the series S and cabling 13, and communicate such characteristics to the second converter 20 through the first converter's communication device 16 and cabling 13 or wiring system 14. The second converter 20 may then use its computing device 27 (after receiving communication signal(s) from the first converter 10 through the second converter's 20 communication device 26) to determine if it is receiving electricity from cabling 13, determine the difference in characteristics of electricity received through cabling 13 from the characteristics of electricity output by the first converter 10, or simply the characteristics of electricity received (such as how consistent power figures are over time).

Thereafter, the second converter 20 could use its computing device 27 to determine if enough electricity is being sent through the cabling 13, or if characteristics of electricity could be altered (for example, more or less voltage, or more a consistent power figure). Depending on such measurements, the computing device 27 may communicate, through the communication device 26, a request for the first converter 10 to alter characteristics of electricity which would ultimately flow to the second converter 20.

For example, the first converter 10 may be sending a total of 0.1 watts of power in a sinusoidal waveform through the cabling 13. Should the computing device 27 determine the second converter 20 should have more power thereto in a more consistent fashion (perhaps to power devices in the series S, or to add more energy to the energy pack 21), the communication device 26 may make such a request to the first converter 10. Thereafter, the first converter 10, after receiving such a communication through its communication device 16, may have its computing device 17 alter the transmission of electricity through cabling 13 by directing the first converter's 10 switching devices and control circuitry to draw or more voltage or increase voltage output from the engine unit(s) 12. Additionally, the computing device 17 may alter the electricity's waveform from a sinusoidal waveform to another waveform, or superimposed state, which may include more than one sinusoidal waveform (such as a pure sinusoidal waveform and a square sinusoidal waveform), a sinusoidal waveform and non-sinusoidal waveforms, more than one non-sinusoidal waveforms, or a novel waveform. Moreover, the computing device 17 may alter the electricity's current type. Indeed, such an alteration would allow for more power and could allow for a more consistent power delivery to the second converter 20.

As may be inferred from FIGS not depicting a wiring system 14, a wiring system 14 is not a requirement to accomplish the above result. As previously noted, but again, each respective computing device 17/27 may perform the same function. As such, only one computing device 17/27 may be needed, where one converter's 10/20 computing needs may be communicated to another converter 10/20 should at least one converter not comprise a computing device 17/27 (as not depicted).

Also, as the electric motor(s) 11 may allow for regenerative breaking, such energy obtained from regenerative breaking may be transmitted to the first converter 10, by which the first converter 10 may transmit such energy to the second converter 20 through cabling 13 or a wiring system 14. The second converter 20 may then allow for such energy to charge the energy pack 21.

It is intended that all matters in the foregoing disclosure and shown in the accompanying drawings be interpreted as illustrative and not in a limiting sense.

What is claimed is:

1. An energy delivery system comprising:
   at least one first converter housed in a locomotive;
   said at least one first converter electrically connected to at least one electric motor;
   said at least one first converter electrically connected to at least one head-end power connector;
   said at least one head-end power connector electrically connected to cabling;
   at least one second converter housed in a railcar wherein the railcar operatively connects to at least another railcar and wherein optionally, the railcar operatively connects to at least a locomotive;
   said at least one second converter electrically connected to at least one energy pack;
   said at least one second converter electrically connected to said cabling;

said at least one first converter in communicative orientation with said at least one second converter; and said at least one second converter configured to operatively select between transmitting electricity in a first waveform and transmitting electricity in a second waveform wherein electricity is transmitted through said cabling and through said at least one head-end power connector to said at least one first converter upon said at least one first converter communicating with said at least one second converter.

2. The energy delivery system of claim 1 wherein said first waveform comprises a sinusoidal waveform and said second waveform comprises a square waveform.

3. The energy delivery system of claim 1 further comprising said at least one first converter operative to output electricity said least one electric motor.

4. The energy delivery system of claim 1 further comprising said at least one first converter electrically connected to at least one engine unit.

5. The energy delivery system of claim 1 further comprising said at least one head-end power system of a power limit rating of four hundred eighty volts, four hundred amps.

6. The energy delivery system of claim 1 further comprising said cabling comprising at least one cable of at least one thousand volts voltage rating.

7. The energy delivery system of claim 1 further comprising said at least one energy pack housed by a railcar.

8. The energy delivery system of claim 1 further comprising said at least one energy pack comprising at least one battery.

9. The energy delivery system of claim 1 further comprising said at least one energy pack comprising at least one hydrogen fuel cell.

10. The energy delivery system of claim 1 further comprising said at least one second converter configured and dimensioned to receive electricity input.

11. The energy delivery system of claim 10 further comprising said at least one second converter operative to alter properties of electricity input and configured and dimensioned to transfer received electricity input to said at least one energy pack.

12. The energy delivery system of claim 1 further comprising said at least one first converter configured to communicate demand data to said at least one second converter.

13. The energy delivery system of claim 12 further comprising said at least one second converter selecting between transmitting electricity in first waveform and transmitting electricity in a second waveform based on at least said demand data.

14. The energy delivery system of claim 1 further comprising at least one wiring system configured and dimensioned to electrically connect said at least one second converter and at least one first converter and operative to transmit electricity in a first waveform and operative to transmit electricity in a second waveform from said at least one second converter to said at least one first converter.

15. The energy delivery system of claim 14 further comprising said at least one first converter configured to communicate demand data to said at least one second converter.

16. The energy delivery system of claim 14 further comprising at least one wiring system configured and dimensioned to electrically connect said at least one second converter and at least one first converter and operative to transmit electricity in a first waveform and operative to transmit electricity in a second waveform from said at least one second converter to said at least one first converter.

17. An energy delivery system comprising:
at least one first converter housed in a locomotive;
said at least one first converter electrically connected to at least one electric traction motor;
said at least one first converter electrically connected to at least one engine unit;
said at least one first converter electrically connected to at least one head-end power connector;
said at least one head-end power connector electrically connected to cabling;
at least one energy storage container comprising at least one energy pack and at least one second converter;
said at least one energy storage container configured and dimensioned to secure to a flatcar wherein a flatcar operatively connects to at least a railcar and wherein optionally, a flatcar operatively connects to at least a locomotive;
said at least one second converter electrically connected to said cabling;
said at least one first converter in communicative operation with said at least one second converter;
said at least one second converter configured to operatively select between remaining in an idle state, transmitting electricity in first waveform, and transmitting electricity in a second waveform wherein electricity is transmitted through said cabling and through said at least one head-end power connector to said at least one first converter upon said at least one first converter wirelessly communicating with said at least one second converter; and
said at least one first converter configured to operatively select between remaining in an idle state, transmitting electricity in a first waveform, and transmitting electricity in a second waveform wherein electricity is transmitted through said at least one head-end power connector and through said cabling to said at least one second converter.

18. The energy delivery system of claim 17 further comprising said at least one first converter is operative to output electricity via pulse width modulation to said least one electric traction motor.

19. The energy delivery system of claim 17 further comprising said at least one head-end power system of a power limit rating of four hundred eighty volts, four hundred amps.

20. The energy delivery system of claim 17 further comprising said cabling comprising at least one cable of at least one thousand volts voltage rating.

21. The energy delivery system of claim 17 further comprising said at least one energy storage container comprising at least one hoist point configured and dimensioned for the removal of said at least one energy storage container from a flatcar.

22. The energy delivery system of claim 17 further comprising said at least one second converter configured and dimensioned to receive electricity input.

23. The energy delivery system of claim 22 further comprising said at least one second converter is operative to alter properties of electricity input and is further configured to transfer received electricity input to said at least one energy pack.

24. The energy delivery system of claim 23 further comprising said at least one second converter selecting between transmitting electricity in a first waveform and transmitting electricity in a second waveform based on at least said demand data.

* * * * *